United States Patent [19]

Prentice

[11] Patent Number: 4,874,145
[45] Date of Patent: Oct. 17, 1989

[54] MISSILE AIR INLET COVER RETRACTOR SYSTEM

[75] Inventor: Robert J. Prentice, El Segundo, Calif.

[73] Assignee: Rockwell International Corporation, El Segundo, Calif.

[21] Appl. No.: 923,450

[22] Filed: Oct. 27, 1986

[51] Int. Cl.$^4$ .............................................. B64D 1/04
[52] U.S. Cl. ............................... 244/53 B; 244/137.4; 89/1.51; 89/1.55; 89/1.8
[58] Field of Search ............... 244/1 TD, 53 B, 137.4, 244/1 R; 89/1.51, 1.55, 1.8, 1.54, 1.811, 1.815

[56] References Cited

U.S. PATENT DOCUMENTS 2,130,504 9/1938 McClane ........................ 244/1 TD
2,751,167 6/1956 Hopper et al. ................. 244/1 TD

FOREIGN PATENT DOCUMENTS 733717 5/1966 Canada .............................. 244/53 B
628081 3/1936 Fed. Rep. of Germany ... 244/1 TD Primary Examiner—Galen L. Barefoot
Attorney, Agent, or Firm—Charles T. Silberberg; Harold C. Weston; Chris Papageorge

[57] ABSTRACT

To effectively recover and stow hardware items from air launched missiles, a housing containing a rotor is mounted on the launching aircraft. The housing has a suitable opening and recess so that a lanyard can connect such hardware items as the missile air inlet cover to the rotor. The rotor has a spring therein under high tension sufficient to retract the missile cover into the housing recess in a short period of time. The spring powered rotor is activated by movement of the missile away from the aircraft but can be manually reloaded and the attachment point of the cover to the rotor manually reset, as desired.

14 Claims, 6 Drawing Sheets

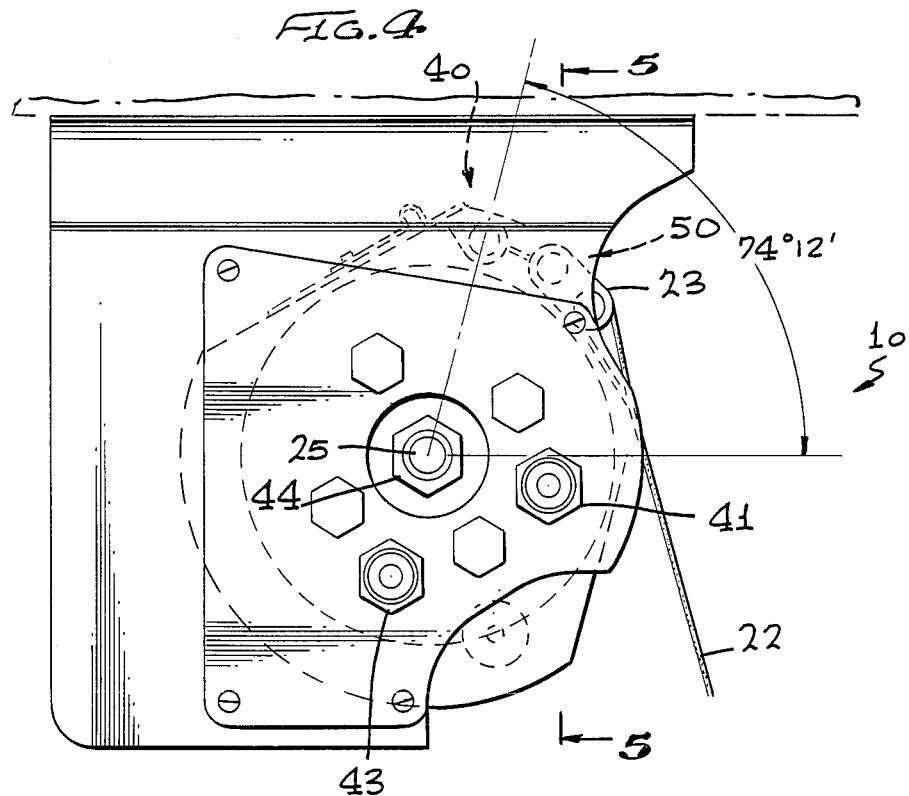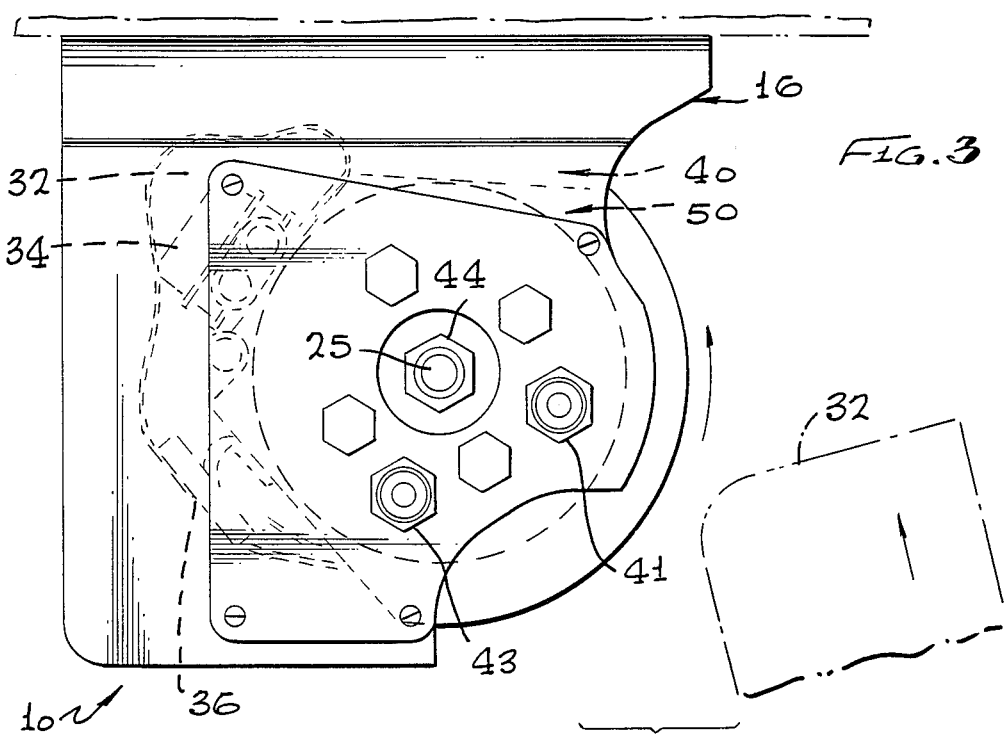

FIG. 7
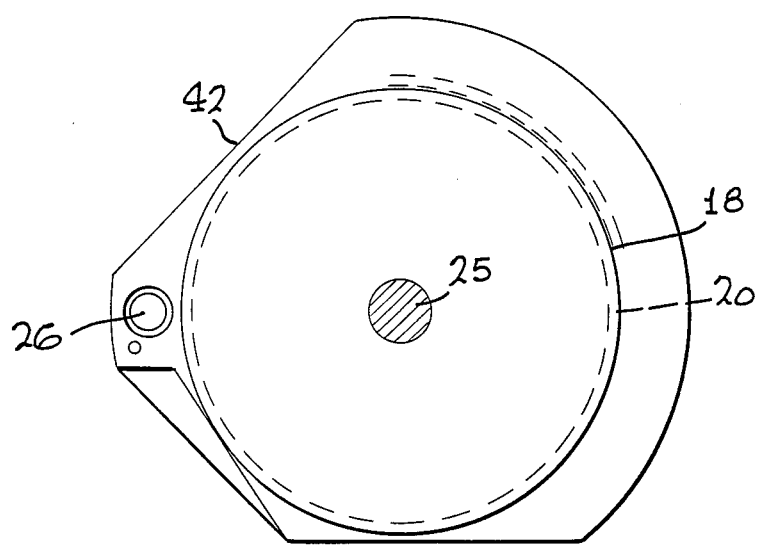
FIG. 8
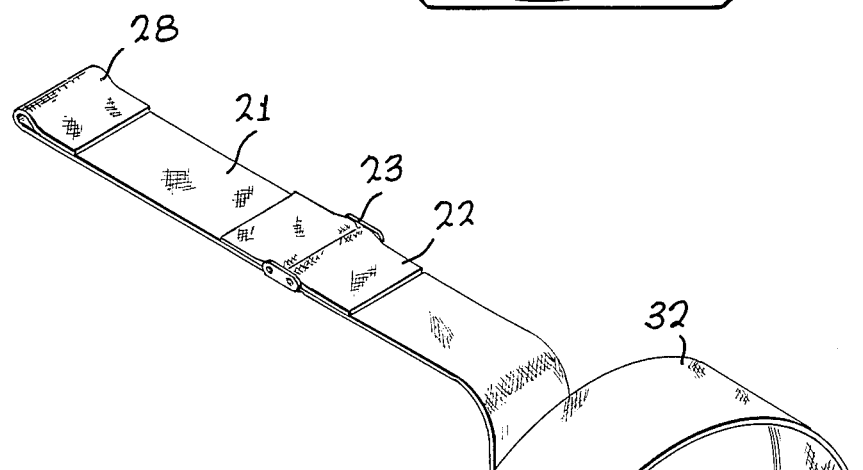
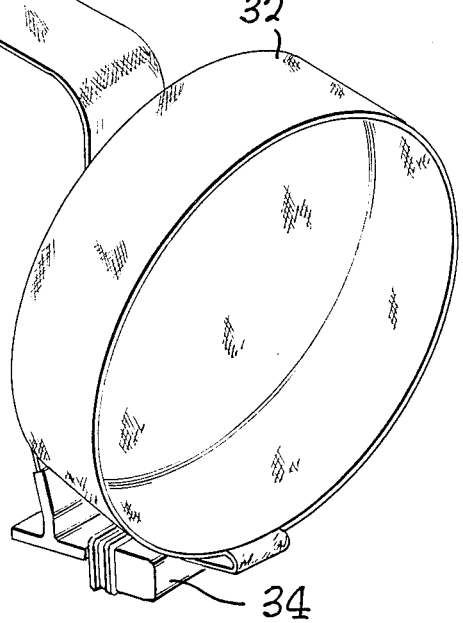

MISSILE AIR INLET COVER RETRACTOR SYSTEM

BACKGROUND OF THE INVENTION

The system of the present invention relates to spring powered retraction systems, and, more particularly, to a high speed retraction system for capturing a cruise missile engine inlet cover, or other item, out of the air stream and generally out of the area where it might get ingested into the engine intake of the aircraft carrying the missile.

Many modern aircraft are adapted to carry weapons such as cruise missiles which are jet powered. These cruise missiles are typically carried on single or dual pylons located in an under portion of the aircraft. It is necessary that the air inlets for the jet engines of the cruise missiles be covered so that subsonic or supersonic air flow through them does not cause the turbines therein to spin freely, resulting in damage to turbine bearings.

Characteristically, the jet engines of cruise missile transport and launching aircraft at high subsonic or supersonic speeds have high suction present around their inlets which can very rapidly draw a loose engine inlet cover of their cruise missile armament into them. Thus, upon launch of the cruise missiles, it is imperative that these covers be withdrawn quickly from the vicinity of the transporting aircraft engine inlet and secured to prevent their being sucked into the intakes causing serious damage to the launching craft.

SUMMARY OF THE INVENTION

It is a principal object of the invention to provide a retraction system which can very rapidly retract a desired item out of the air stream and toward an aircraft.

It is another object of the present invention to provide a retraction system which can retract an item out of the air stream in response to release of a carried assembly from an aircraft.

It is also another object of the present invention to provide a retraction system which may be quickly and easily removed from the aircraft.

It is still another object of the present invention to provide a retraction system which can be reset and precisely adjusted manually.

It is yet a further object of the present invention to provide a high power retraction system which is compact.

It is also an object of the present invention to provide a high power retraction system which may be used with single or dual pylons, the B-52 pylon, the B-1B CSRL (Common Strategic Rotary Launcher), the B-52 CSRL, and on the proposed advanced tactical bomber CSRL.

The system of the present invention is specifically designed to be a high power, manually adjustable apparatus for retracting a missile air inlet cover out of the wind blast and out of an area in the air stream where it could cause damage to the transport/launch aircraft jet engines. An important feature of the present invention is the speed and power with which it is able to retract the missile cover into its housing.

Generally, the invention comprises a housing for a rotor. A lanyard or other suitable connector such as a strap connects the missile cover to an opening in the rotor. The lanyard is detachably connected to the rotor by means of a pin which is locked into the opening. The position of the opening relative to the missile air inlet may be manually adjusted. Essentially, this allows easy adjustment of the tension or slack on the lanyard. A recessed nut on the side of the housing connects to the rotor and allows the rotor to be rewound by means of a ratchet wrench after retraction of the lanyard and cover. It is also important that since the apparatus is bolted to the pylon or a structural part of the aircraft, it must be removeable therefrom when not needed to reduce aircraft weight and allow more fuel to be loaded or to provide for other armaments.

Since the apparatus itself as well as the lanyard and cover may be exposed to subsonic or supersonic wind blast, the apparatus is protected from the wind blast by its structure and positioning. The opening and the recess into which the lanyard and cover are retracted are facing away from the wind blast. Moreover, there is a strong metal shield facing the wind blast which protects the rotor and other retractor components from high speed airstream damage.

Since the relative speed of the cover during retraction may be as high as 200 miles per hour, it is necessary to ensure that the cover and lanyard are both retracted directly and smoothly into the recess provided therefor. Therefore, a suitable guide platform is provided adjacent to the recess in order to properly direct the lanyard and cover into the recess thereby preventing the lanyard and cover from getting hung up in another part of the housing or rotor during retraction.

From the foregoing, it is apparent that the system of the present invention provides a very fast and powerful retracting device preventing the cover and lanyard from being ingested into the air intake of the aircraft jet engine and causing damage thereto. Design of the system enables it to be easily reset and rewound as required.

BRIEF DESCRIPTION OF THE DRAWINGS

FIG. 3 illustrates the system of the present invention retracting the cover and lanyard and further illustrating the position of the cover and lanyard in the housing after retraction.

FIG. 4 is a side view of the system of FIGS. 1, 2 and 3 showing the component parts thereof in more detail.

FIG. 7 is a cross-sectional view taken along the line 7—7 in FIG. 5 snowing the internal structure of the rotor.

FIG. 8 is a perspective view of the lanyards, missile inlet cover, ECS plug and activating ring of the present invention.

DETAILED DESCRIPTION OF THE PREFERRED EMBODIMENT

Figures 1, 2:
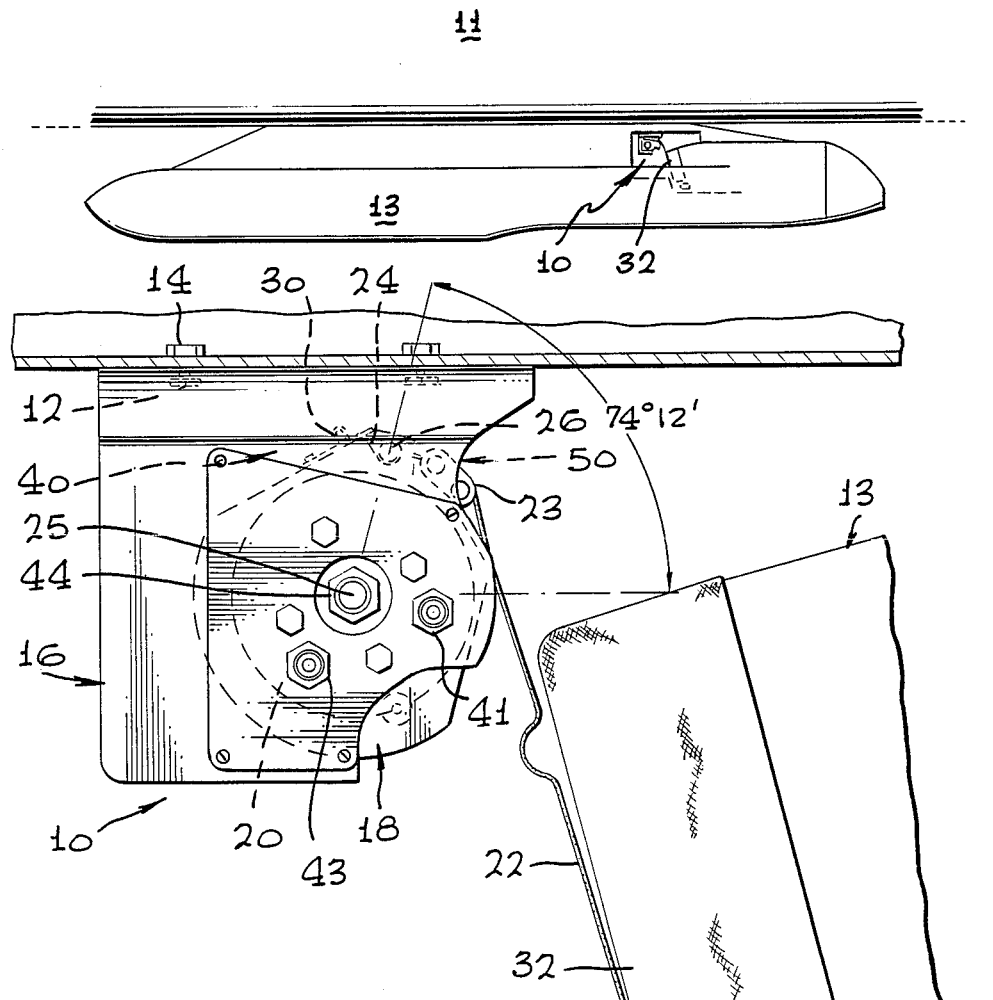
FIG. 1 is a side perspective view of the system of the present invention mounted on an aircraft structure and connected to an air inlet of a missile shown partly in phantom.
FIG. 2 is a side view of the system of the present invention showing the rotor in combination with the lanyard and cover when the missile is mounted on the aircraft.

Referring to the drawings, the system of the present invention is generally designated by the numeral 10. FIGS. 1, 2 and 3 show the retractor system 10 mounted on an aircraft. FIG. 1 particularly shows the positioning of the retractor system 10 in relation to the aircraft and the missile. FIGS. 2 and 3 show the particular attachment means which include a plurality of bolts 12 and nuts 14 connecting the housing 16 of the system directly to an aircraft structure.

Figure 5:
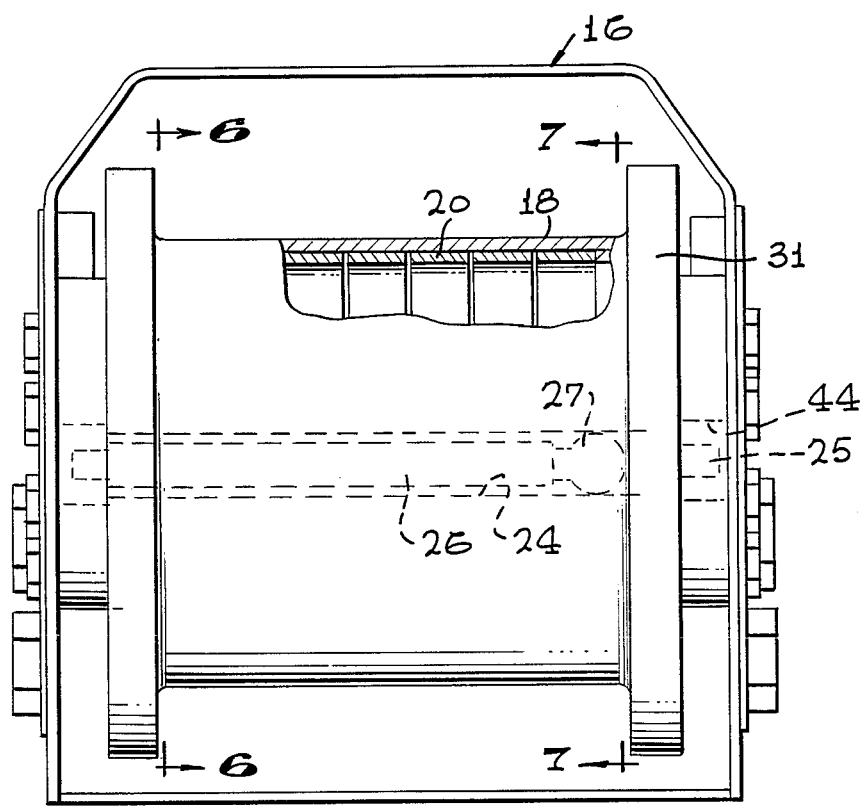
FIG. 5 is a cross-sectional view of the front of the system taken along the line 5—5 in FIG. 4 with a partial cut away portion to show the springs within the rotor and also illustrating some of the inner component parts in phantom.
Figure 6:
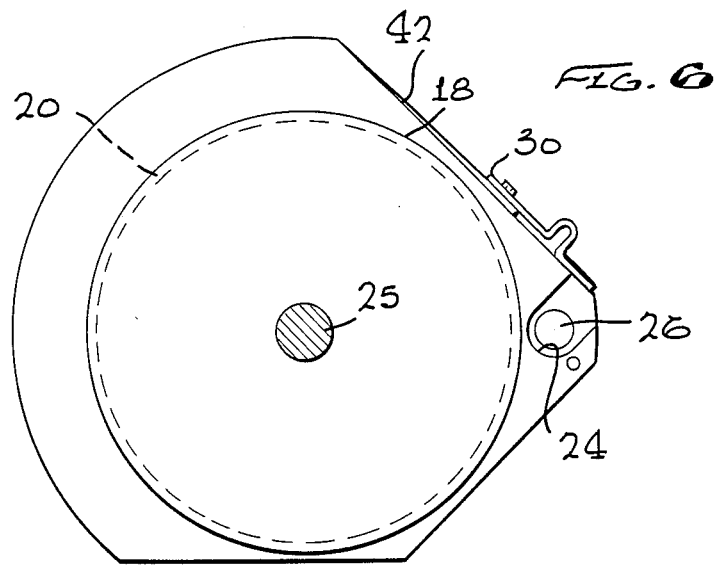
FIG. 6 is a cross-sectional view taken along the line 6—6 in FIG. 5 illustrating the internal structure of the rotor.
Figure 9:
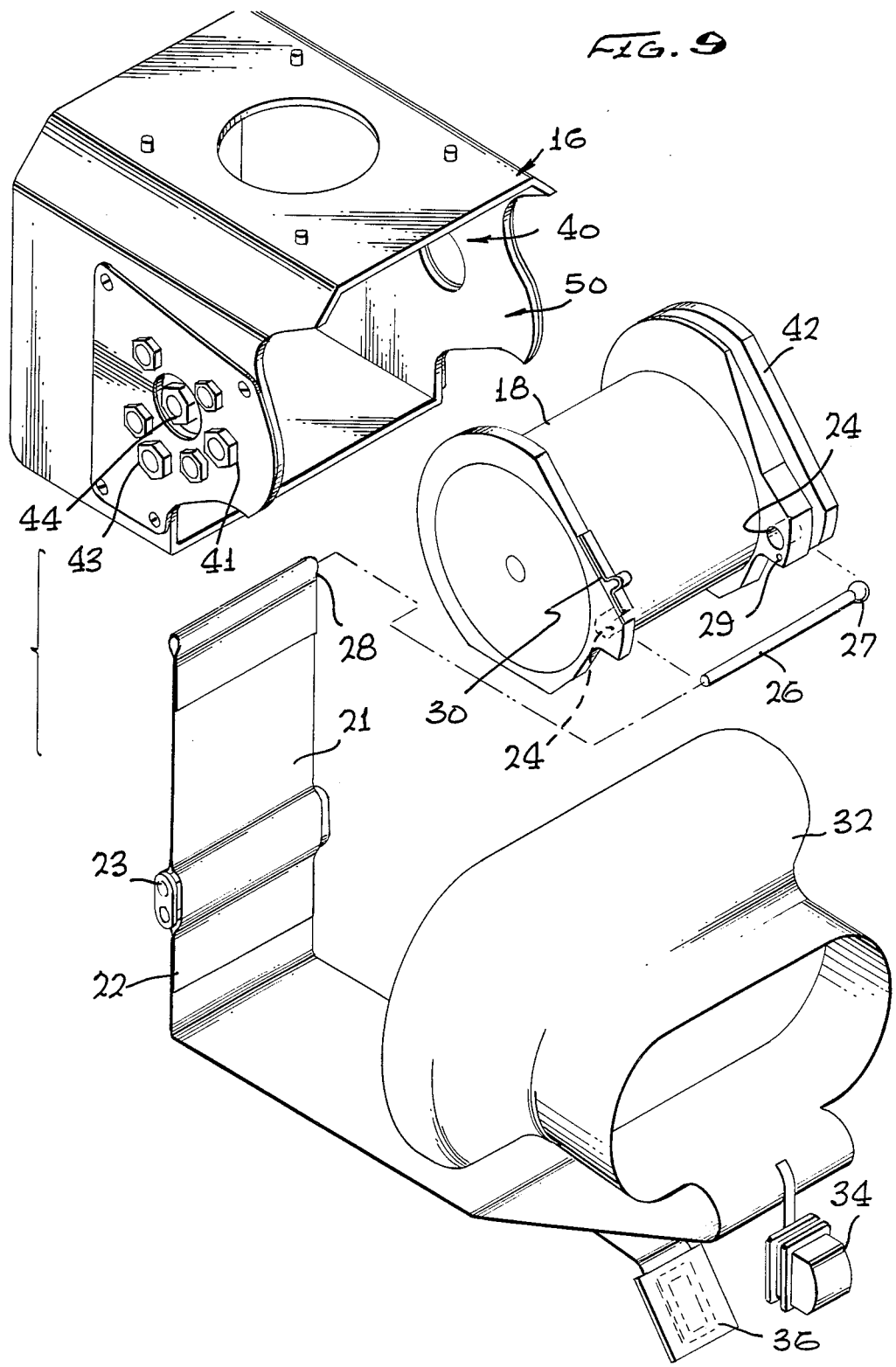
FIG. 9 is an exploded view of the system of the present invention.
Figure 10:
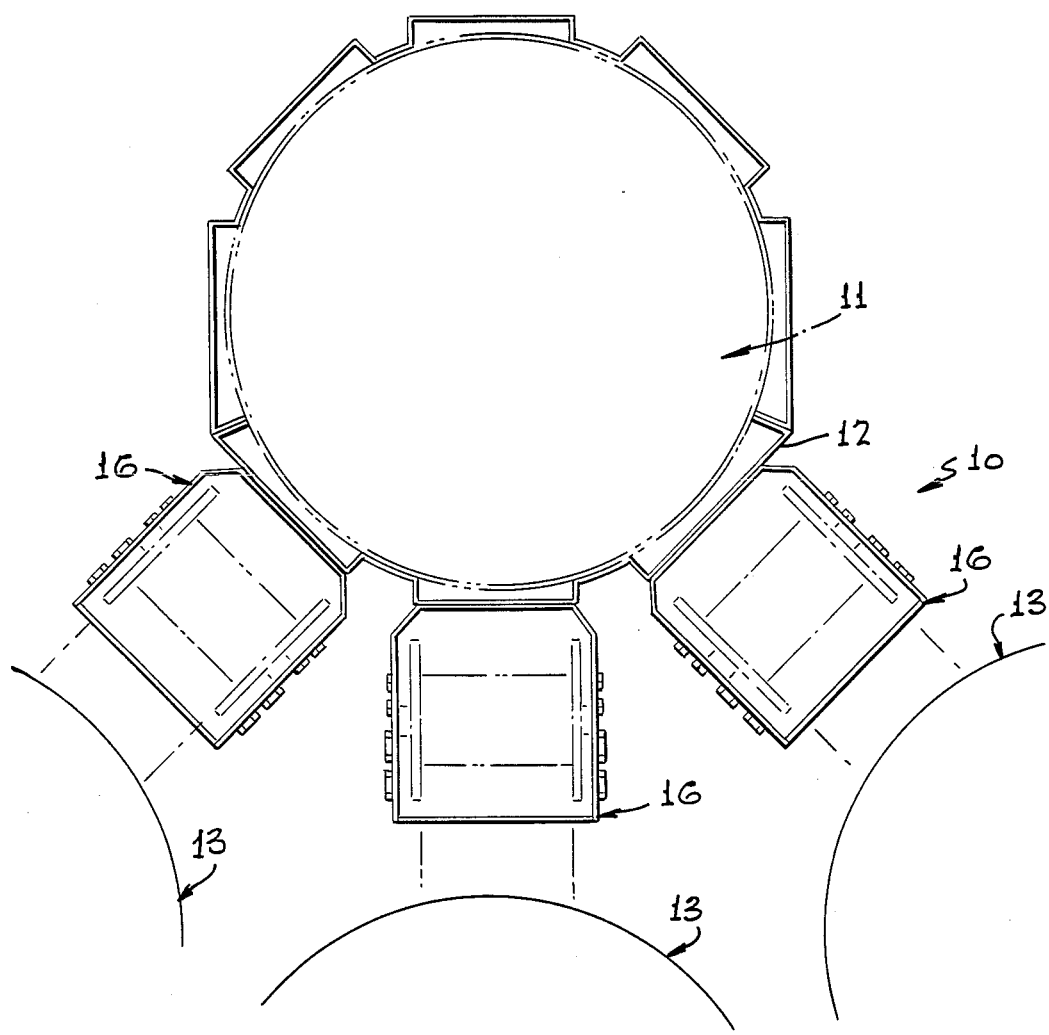
FIG. 10 illustrates the system of the present invention used with a CSRL.

The housing 16 contains a rotor 18 which is driven by means of a spring 20 shown generally in FIGS. 2, 3, 4, 6, and 7 and shown in more detail in FIG. 5. An upper lanyard 21 is connected to a suitable opening 24 in the rotor by a shaft 26 which fits through a loop 28 in the lanyard 21 and in the opening. A suitable locking mechanism 30 which may simply be a sliding plate 30 locks the shaft 26 in position and prevents the lanyard from being pulled from the rotor 18. The upper lanyard 21 is preferably flexible so that it may be wound around the rotor 18. A lower lanyard 22 is connected to the upper lanyard by a suitable connector 23. The lower lanyard 22 is connected at its lower end to a cover 32 for the air inlet of a cruise missile.

Although specifically described with respect to retracting a missile air inlet cover from the windblast or airstream, any of a variety of suitable items may be connected to the rotor as may be desired for removal from the windblast quickly and with great force, as the present invention is capable of doing. In addition, instead of a missile, the system may be used with any of a variety of suitable assemblies.

The lanyard 22 also is connected to a missile ECS plug 34. In addition, a ring 36, preferably connected to the lower end of the lanyard, is inserted in the missile structure. The ring 36 retains the lanyard as the missile is released from the aircraft for a sufficient period of time during separation of the missile from the aircraft to exert a force on the shaft 26 and thereby on the rotor 18 tending to rewind the rotor; the force exerted on the rotor 18 is of a sufficient magnitude to cause the activating member 3u to retract the lanyard. An end portion 27 of the shaft 26 rests on an activator pin 29 situated in the opening 24. When the force exerted on the pin 29 by the shaft 26 exceeds a preselected value it is pushed into the rotor releasing a clutch 31 (FIG. 5) which allows the springs 20 to rotate the rotor 18 thereby retracting lanyards 21 and 22. The clutch 31 may be spring powered, or it may be any other type of suitable clutch mechanism.

Once the retraction of the lanyards 21 and 22 commences, the ring 36 is released from the missile structure and retracted along with the missile cover and ECS plug into the recess 40 of the housing. Alternatively, however, the ring 36 may simply separate from the lanyard or break off as a certain level of force is exerted thereon caused by separation of the missile from the aircraft.

Since the cover 32 and lanyards 21 and 22 are typically subjected to subsonic or supersonic speeds while the aircraft is in flight and at the time the missile is released therefrom, it is imperative that the rotor retract the missile cover and ECS plug as well as the ring, if any, very rapidly out of the wind blast. Since the missile cover 32 itself may, for example, be 6 to 8 inches in diameter, it is large enough that the supersonic airstream to which it is subjected may exert a force of 200 pounds or more thereon. Consequently, the rotor 18 is required to pull on the lanyard with a counter force in excess of the force exerted by the wind blast in order to retract the lanyard 22 and missile cover 32. In this regard, the force of retraction exerted by the rotor 18 must be greatly in excess of this counteracting force in order to retract the lanyard 22 and missile inlet cover 32 very rapidly. Indeed, the spring tension of spring 20 may be set to exert a force of 300 pounds or more on the lanyards 21 and 22. Thus, with such a high magnitude of force exerted on the lanyard 22, the missile cover 32 and other parts can be retracted into the recess in approximately 0.10 to 0.20 seconds. This rapid retraction ensures that the missile cover 32 and other parts cannot get torn from the lanyard 22 or shredded by the wind blast and be ingested by the air inlet of the aircraft jet engines causing foreign object damage to the engines.

The spring 20 is preferably five power springs of clock mainspring configuration (FIG. 5). The outer ends of the springs 20 are secured to the rotor 18. The inner ends of the springs 20 are secured to a mainshaft 25 which is connected at its ends to nut 44 so that rotation of nut 44 rotates mainshaft 25.

The rotor 18 has a flat surface 42 on either side of the opening 24 to allow the missile to have clearance during upload, during flight and during launch of the missile.

The rotor may be rewound after the retraction cycle by means of rotation of the nut 44 which rotates the main shaft 25 of the rotor 18. Nut 44 may be manually rotated by means of a ratchet wrench or other suitable means.

In order to arm the spring 20, the center drive control nut 44 is rotated counterclockwise (from the left side of the housing) to a preselected position. At this position, rotation of winding control knob 41 to the arm position will cause a lug (not shown) to engage a detent (not shown) on the rotor 18 which limits rotation of the rotor 18. Further rotation of the nut 44 will wind the spring 20 thereby arming the spring.

In order to prepare the system 10 for launch of a missile once the spring 20 is armed, the nut 44 is rotated clockwise to another preselected position at which the knob 41 is rotated to the free position retracting the lug from engagement with the rotor. The nut 44 is rotated counterclockwise to still another preselected position at which launch control knob 43 is rotated to cause a lug (not shown) to engage a detent (not shown) on the rotor 18. When rotation of the nut 44 positions the rotor 18 at the position where the lug and detent of the control knob 43 act as a stop, the system 10 is ready for launch.

The rotor 18 may also be positioned simply by means of turning nut 44 so as to move the opening 24 relative to the missile cover. The relative position of the opening 24 also facilitates retraction of the cover 32 and lanyards 21 and 22 into the recess. Preferably, the opening 24 is positioned 74° 12' positively inclined from the x-y plane of the aircraft to accommodate the length of the lanyard used with the particular missile inlet cover. This positioning capability, in effect, also provides a simple means of tensioning the lanyard to eliminate excess slack therein. In addition, rotation of nut 44 also adjusts the amount of rotation, i.e., number of revolutions, of the rotor 18 to accommodate the travel of the lanyard. The force exerted by the spring 20 is preferably preset.

The housing also has an open face 50 which is cut at an angle as shown in FIGS. 2, 3 and 4. At this particular angle the face 50 is sufficiently large and has the required shape to allow unimpeded movement of the lanyards 21 and 22 and missile cover 32, which may be retracted at speeds of up to 200 miles per hour, smoothly and directly into the recess 40. The open face or cut away portion 50 of the housing also allows a reduction in weight of the entire system 10 which is very important in aircraft applications.

The housing 16 is preferably made of stainless steel and the rotor 18 is preferably made of aluminum. However, other suitable materials including many other types of metals and plastics may also be used.

Accordingly, there has been provided, in accordance with the invention, a retraction system for missile inlet covers and other parts that fully satisfies the objectives set forth above. It is to be understood that all terms used herein are descriptive rather than limiting. Although the invention has been described in conjunction with the specific embodiment set forth above, many alternative embodiments, modifications and variations will be apparent to those skilled in the art in light of the disclosures set forth herein. Accordingly, it is intended to include all such alternative embodiments, modifications and variations that fall within the spirit and the scope of the invention as set forth in the claims hereinbelow.

I claim:

1. In a system useable for launch of missiles from a transporting aircraft, article retraction apparatus comprising:
    a housing detachably mounted on said aircraft, said housing having a recess for containment of articles retracted from said missile during or immediately prior to launch;
    a rotor contained within said housing, said rotor being spring driven and coupled to said article by flexible retractor means;
    adjustment means for controlling said spring driven rotor in tension and total travel; and
    means for initiating operation of said retraction apparatus.

2. Apparatus of claim 1 further including a means for adjusting the number of revolutions said rotor turns to retract said article, thereby adjusting the distance traveled by the article during retraction.

3. Apparatus of claim 1 wherein said flexible retractor means comprises a lanyard adaptable for winding around said rotor during retraction.

4. Apparatus of claim 3 wherein said rotor has an opening capable of accepting a pin, said pin being coupled to said lanyard so as to detachably couple said retractable article to said rotor.

5. The apparatus of claim 4 further including a locking means for securing said pin to said opening.

6. The apparatus of claim 5 including means for controlling the position of said opening through adjustment of said rotor.

7. Apparats of claim 1 including means for controlling the angular displacement of said rotor to a preestablished position.

8. Apparatus of claim 7 wherein said controlling means are manually operable.

9. The apparatus of claim 1 wherein said means for initiating operation includes an activator member coupled to said missile so that separation of said missile from said transporting aircraft causes said rotor to wind said lanyard therearound and so retract said recess.

10. Apparatus of claim 1 wherein said housing covers at least that side of said rotor opposite the recess so that said recess is downstream in said aircraft's slipstream.

11. Apparatus for retracting an air inlet cover from a missile detachably mounted on an aircraft out of the air stream and toward the aircraft, comprising:
    a rotor;
    a lanyard strap connecting said rotor to the cover;
    a housing removably attached to the aircraft, said housing having a recess for receiving the cover and said lanyard, said housing positioned to shield the cover, said rotor and said lanyard from the air stream;
    a spring mounted within said rotor, said spring driving said rotor a sufficient number of turns to retract the cover through a selected distance into the recess;
    means for manually rewinding said rotor into a retraction ready position;
    means for automatically activating said spring in response to separation of the missile from the aircraft resulting from detachment of the missile therefrom, said means for activating connected to said spring and detachably connected to the missile.

12. The system of claim 11 further including an activator ring connected to said lanyard and detachably connected to the missile, said ring remaining connected to the missile after detachment of the missile from the aircraft until a predetermined degree of separation of the missile from the aircraft.

13. The apparatus of claim 11 further including a locking means for locking the lanyard onto said rotor.

14. The apparatus of claim 11 further including a means manually adjusting the force exerted by said spring.

* * * * *